Aug. 11, 1959

W. F. NEWHOUSE 2,898,595

MECHANICAL MEANS FOR THE MAKING OF
WIREBOUND BOX AND CRATE MATS

Filed Dec. 5, 1956

*INVENTOR:*
WALTER F. NEWHOUSE
BY
Marzall, Johnston, Cook + Root
ATT'YS

United States Patent Office 2,898,595
Patented Aug. 11, 1959

2,898,595

MECHANICAL MEANS FOR THE MAKING OF WIREBOUND BOX AND CRATE MATS

Walter F. Newhouse, Benton Harbor, Mich.

Application December 5, 1956, Serial No. 626,473

15 Claims. (Cl. 1—146)

This invention relates to machinery for making wirebound box and crate mats, or similar mats, and more particularly to machinery for assembling and fastening crate parts, such as cleats and slate, and binding wires together in the fabrication of wirebound crate mats.

Difficulties encountered in the making of wirebound box and crate mats of wooden cleats and slats and binding wires in a continuous operation on a machine includes properly arranging the crate parts with respect to each other so that they may be fastened together by staples or other fastening means since the wooden cleats and slats are not always of the exact same shape and size. Further, many of the crate parts are initially placed on the machine by hand while the machine is in operation, and it is therefore actually impossible to exactly position the crate parts as desired prior to the stapling operation. A crate mat, in tubular form, should be capable of collapsing completely flat for shipping and storing purposes, and therefore, it is important that certain other crate parts be accurately positioned with respect to the binding wires for the flat folding arrangement.

The present invention is in a box and crate-making machine capable of assembling cleats and slats and binding wires in order to fabricate a crate and box mat, or similar mat, wherein the wooden cleats and slats may vary slightly in size and shape, and the finished mat may be easily and quickly flat folded in collapsed position for shipping and storage purposes. The machine includes stapling units for driving staples into prearranged crate parts which are fed thereto continuously by an endless conveyor. Means are provided on the conveyor ahead of the stapling units for accurately aligning and arranging wooden cleats and slats, regardless of slight variations in size and shape, and arranging binding wires so that the finished crate mats will be substantially uniform.

Accordingly, it is an object of this invention to provide an improved machine for making box and crate mats from wooden crate parts and binding wires.

Another object of this invention resides in the provision of a crate-making machine having stapling units for fastening crate parts and binding wires together, wherein means are provided immediately ahead of the stapling units for accurately arranging the crate parts and wires notwithstanding slight variations in size and shape of supposedly identical crate parts.

A further object of this invention is to provide a crate-making machine having stapling units for fastening wooden cleats and slats and binding wires together on an endless conveyor including transversely spaced cleat guideways for slideably receiving and positioning cleats of the crate mats.

A still further object of this invention is to provide crate-making machinery for fabricating crate mats from wooden cleats and slats and binding wires in one continuous operation, wherein the corner slats are accurately arranged with respect to the ends of the cleats thereby providing a neat looking and efficiently constructed crate mat.

Other objects, features, and advantages of the invention will be apparent from the following detailed disclosure, taken in conjunction with the accompanying sheets of drawings, wherein like reference numerals refer to like parts in which.

Figure 10:
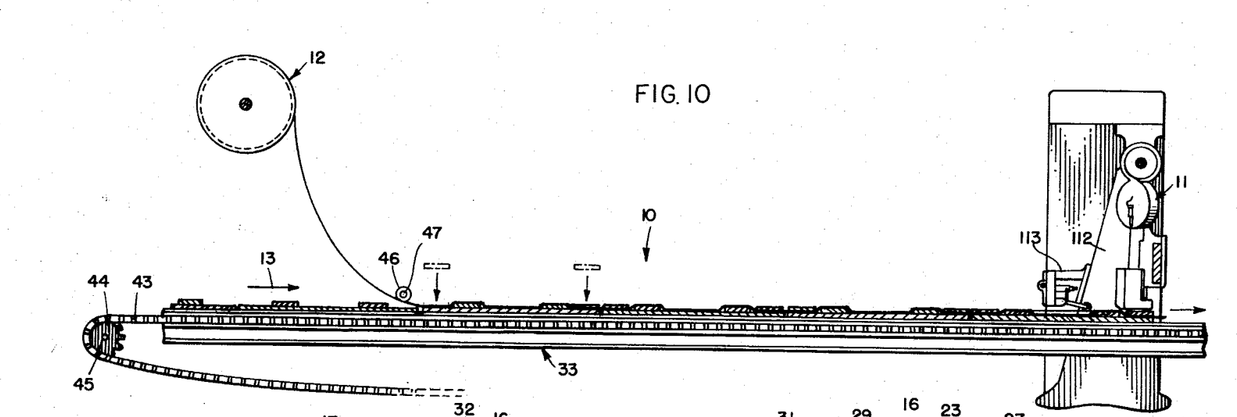
Fig. 10 is a side elevational view, somewhat diagrammatic, of the crate-making machine according to the invention and illustrating the manner in which the binding wires are associated with the crate parts, and taken substantially along line 10—10 of Figs. 2 and 3.

Referring particularly to Fig. 10, in general, the box and crate-making machine of the present invention includes a conveyor 10 for assembling crate parts and delivering them to a plurality of stapling units 11 which fasten the crate parts together to fabricate crate mats and the like, and wire spools 12 mounted above the conveyor for feeding binding wires to the assembled crate parts on the conveyor. The crate parts, including wooden cleats and slats are manually arranged on the moving conveyor by one or more persons standing at one side of the machine and ahead of the stapling units. The direction of movement of the conveyor is indicated by the arrow 13, Fig. 10, which advances the assembled crate parts to the stapling units.

Figures 1, 2:
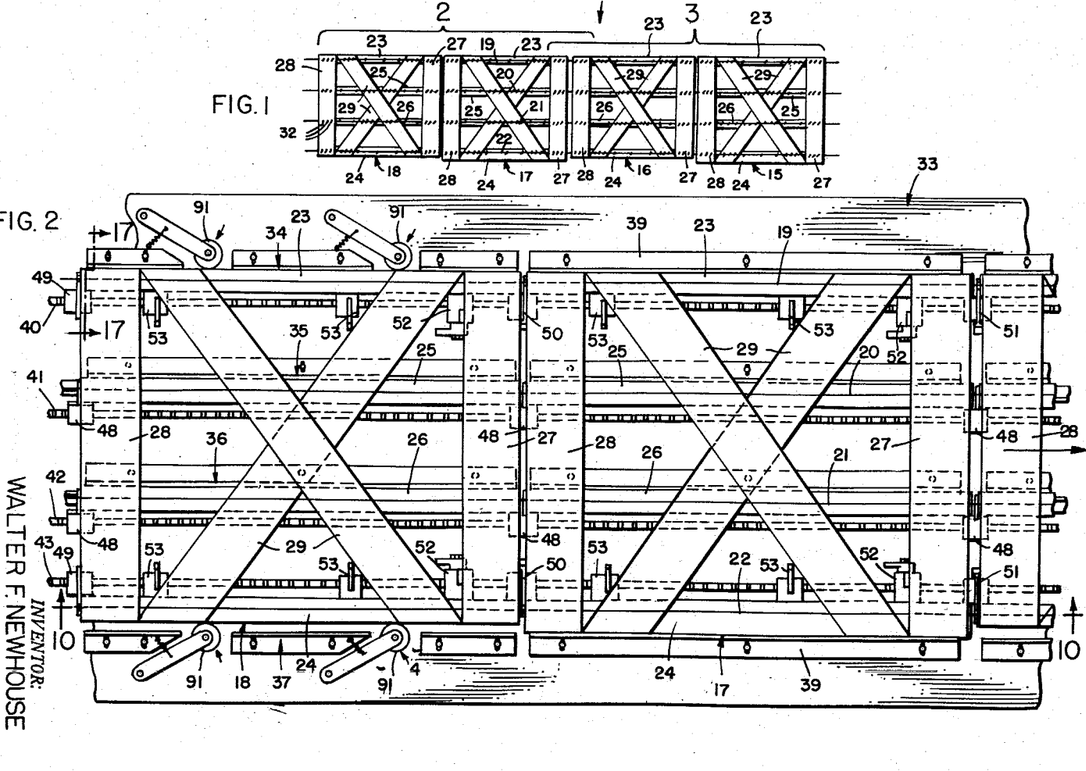
Fig. 1 is a plan view of an exemplary crate mat fabricated from the machine of this invention.
Fig. 2 is a fragmentary plan view of a portion of the machine according to the invention, with some parts omitted, illustrating the manner in which the members carried on the conveyor chains function to space and push certain cleats and slats of that portion of the crate mat substantially within bracket 2 of Fig. 1.

While the present machine may be set up to construct most any type of a wirebound box or crate mat and other similar parts, for purposes of illustrating and explaining the present invention, the machine has been set up to make a crate mat as disclosed in Figs. 1, 11, 12, and 13, and designated in Fig. 1 generally by the numeral 14. This crate mat includes four panels 15, 16, 17, and 18 hingedly connected together by binding wires 19, 20, 21 and 22, which extend a predetermined distance beyond the end panels 15 and 18. It may be noted that panels 15 and 17 are identical in size and shape while panels 16 and 18 are identical in size and shape. Each panel includes upper and lower outside cleats 23 and 24 and intermediate outside cleats 25 and 26 which have secured thereto corner slats 27 and 28 and intermediate crossed bracing slats 29.

Figures 11, 12, 13:
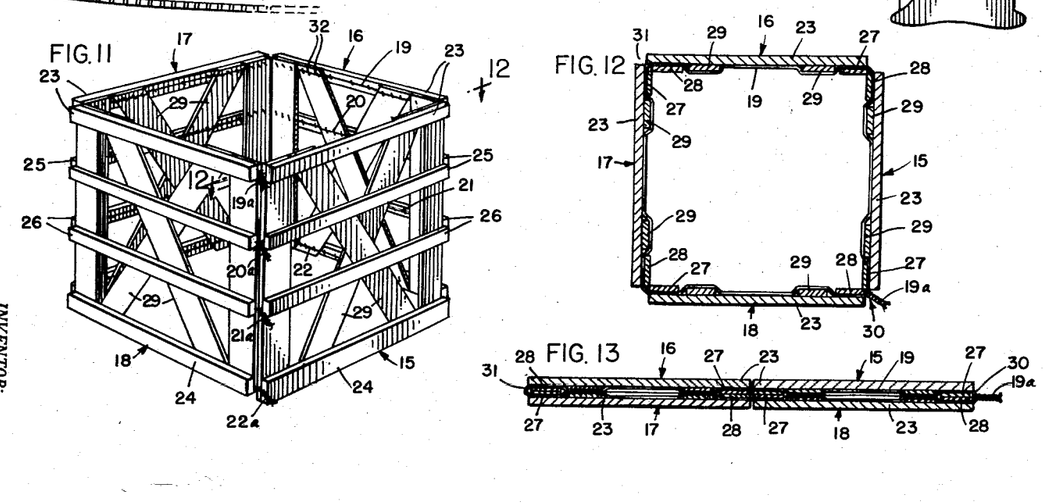
Fig. 11 is a perspective view of the crate mat of Fig. 1 in assembled tubular form.
Fig. 12 is a transverse sectional view, taken substantially along line 12—12 of Fig. 11.
Fig. 13 is a transverse sectional view taken along one end of the crate mat when in its collapsed folded form.

As seen most clearly in Figs. 12 and 13, the binding wires extend between the inner faces of the cleats and the outer faces of the corner slats and along the inner faces of the crossed intermediate bracing slats, this arrangement providing a rigid and durable structure, and the free ends are twisted together at the locking corner 30, as indicated at 19a, 20a, 21a, and 22a. It may be further noted at the folding corner 31, opposite the locking corner 30, that the corner slats 27, 28 are displaced slightly inwardly from the ends of the cleats. This arrangement provides a longer unsupported length of binding wire between the panels 16 and 17, thereby enabling the crate mat when in tubular form to be collapsed in a flat folded position, Fig. 13, without placing undue strain on the various crate parts due to pulling of the wires. The slats and cleats and the binding wires will be fastened together by staples, and the staples will be driven through the crate parts along the binding wires in straddle relation therewith and clinched on the outside, as indicated by the staples 32 in Fig. 11. In order for the proper flat folding to be achieved, it will be appreciated that the length of the wire between the panels 16 and 17 be at least equal to the thickness of the corner slats 27 and 28, but preferably a little longer. The arrangement is such, therefore, that the crate, when expanded will appear as shown in Figs. 11 and 12, but for shipping and storage purposes, the crate will be in its flattened formation, as shown in Fig. 13.

Figures 17, 18, 19, 20:
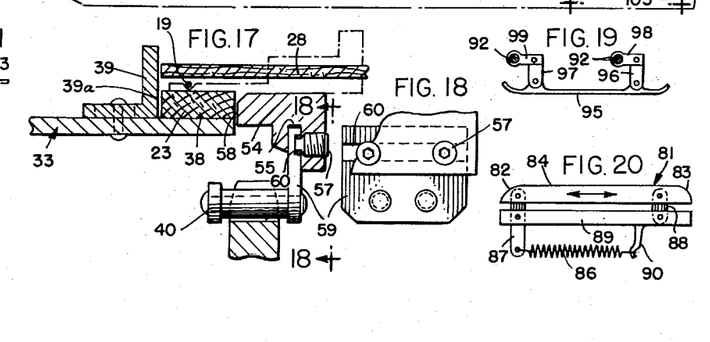
Fig. 17 is an enlarged view taken substantially along line 17—17 of Fig. 2 and illustrating the manner in which one of the pusher members on the chain engages a slot and cleat.
Fig. 18 is a detailed side elevational view taken along line 18—18 of Fig. 17.
Fig. 19 is a detailed side elevational view of one of the presser bars, taken substantially along line 19—19 of Fig. 14.
Fig. 20 is a detailed side elevational view of the spring biased cam which actuates the cammed pusher member shown in Fig. 8 as it passes thereover in order to accurately align the leading slats of each panel in accordance with their desired positions with respect to the ends of the cleats.

The conveyor which advances prearranged crate parts to the stapling units includes a conveyor bed 33, Figs. 2, 3, 10, and 14, having longitudinally extending and transversely spaced cleat guideways 34, 35, 36, and 37. The outer cleat guideways 34 and 37 are adapted to slidably receive the upper and lower cleats 23 and 24, while the inner guideways 35 and 36 are adapted to slidably receive the intermediate cleats 25 and 26. Each guideway includes, as seen in Fig. 17, a bottom horizontally extending face 38 upon which the outer surface of the cleats slide along and an angle bar 39 adjustably secured to the conveyor bed and having a vertical face 39a for slidably engaging one of the side edges of the cleats. Preferably, the angle guide bars 39 are provided in section along the longitudinal axis of the conveyor in order to facilitate adjusting operations.

Adjacent the guideways 34, 35, 36, and 37 are endless chains 40, 41, 42, and 43 which are trained around sprockets 44 mounted on a common shaft 45 at one end and around a similar sprocket and shaft arrangement (not shown) at the other end. It will be understood that the sprocket shafts are supported by the conveyor bed, which is suitably supported above the floor, although these elements have not been shown for purposes of clarity and since they are not a part of the present invention. As seen in Fig. 10, the chains extend beneath the stapling units 11 and will travel a distance therebeyond for purposes of allowing the crate mats to be removed from the conveyor in orderly fashion.

Referring particularly to Fig. 10, the cleats are initially arranged in the cleat guides of the machine and the intermediate bracing slats are placed thereover. These partially assembled crate panels are then passed under the binding wires which are fed therealong in substantial alignment with the cleat guideways and under a plurality of transversely spaced grooved rollers 46 which are supported on a common shaft 47 above the conveyor bed. The corner slats are then arranged on the panels of the crate and over the binding wires before the panels are fastened together by the stapling units 11. A more specific description of the method of making the crate mat is disclosed in my copending application Serial No. 626,472, filed December 5, 1956. The power for driving the conveyor chains may be applied to the shaft 45 or the shaft at the other end of the machine, whereby all of the chains will be driven in unison.

Figure 3:
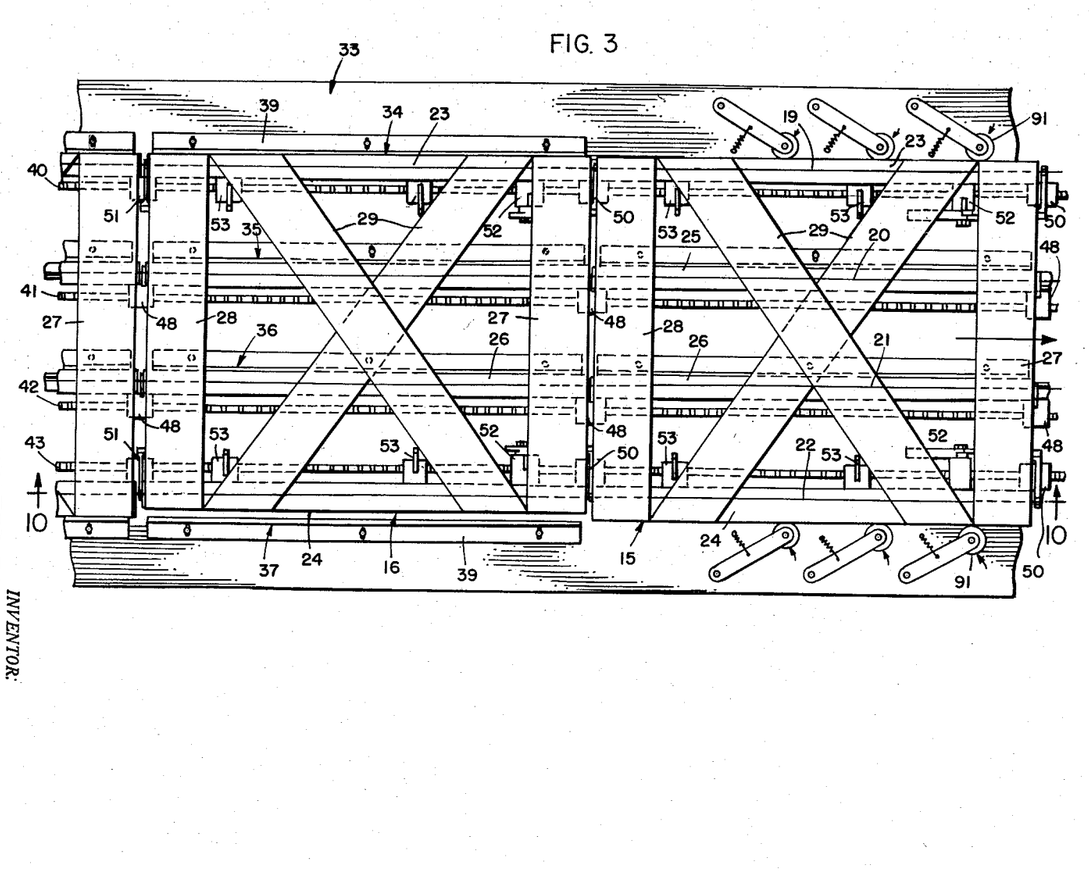
Fig. 3 is a fragmentary plan view of a portion of the machine according to the invention, with some parts omitted, similar to Fig. 2, but showing the manner in which the cleats and slats embraced within bracket 3 of Fig. 1 are arranged in accordance with the conveyor elements.

An important feature of the present invention is the set up of the various pusher dogs shown in Figs. 4 to 9 on the conveyor chains, the particular arrangement of the dogs in the present application being to make a crate mat as disclosed in Figs. 1, 11, 12, and 13. The particular arrangement of the pusher dogs is seen in Figs. 2 and 3 which illustrate a complete crate mat with the crate parts arranged according to the positions of the various dogs.

As seen in Figs. 4 to 9, a plurality of various shaped dogs 48, 49, 50, 51, 52, and 53 are employed for prearranging the crate parts along the conveyor chains. Each of the dogs 48, 49, 50, 51, and 53 have one feature in common in that their body portions 54 are identical in size and shape, except for the body portion of the dog 52 which is wider. Downwardly opening slots or grooves 55 are provided in each body portion 54, and spaced tapped holes 56 are employed for receiving set screws 57. The tapped holes are positioned along a line parallel to the top of the body portion and may adjustably be moved into the area of the grooves 55. Along one side of the body portion, vertical faces 58 serve to coact with the adjustable guide bars 39 in contacting the opposite edge of the cleats in order to prevent lateral movement of the cleats as they are advanced along the cleat guideways 34. The manner in which this vertical face functions is seen in Fig. 17.

Figures 22, 23, 24:
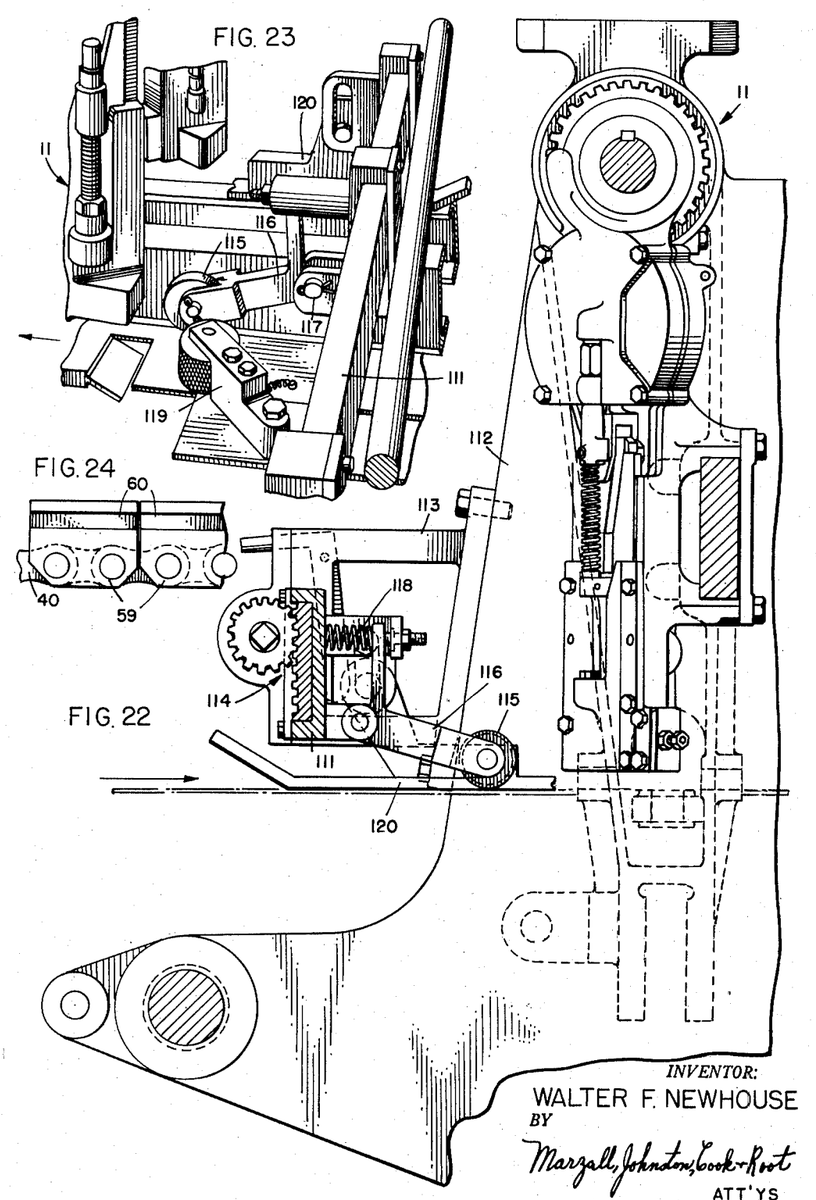
Fig. 22 is a fragmentary side elevational view of one of the stapling units, and a portion of the aligning and holddown means immediately ahead of the stapling units which is utilized in the crate-making machine of the present invention.
Fig. 23 is a fragmentary perspective view showing the aligning means immediately ahead of the stapling units.
Fig. 24 is a partially fragmentary and side elevational view of one of the conveyor chains and a pair of side plates for carrying the various pushing and arranging members such as illustrated in Figs. 4 to 9.

The construction of the body portions of the dogs is such as to allow adjustable mounting on the conveyor chains which have at one side a plurality of upstanding and abutting side plates 59, as seen in Figs. 17, 18, and 24. Each side plate is provided with a horizontally extending mounting groove 60 and is of such size as to be freely received within the grooves 35 of the dog body portions, wherein the set screws 57 align with the grooves 60, as seen in Fig. 17.

It is only necessary when mounting a dog on a side plate to utilize a single set screw 57. The two set screws are provided in spaced relationship in order to accommodate such situations where one of the set screws may align with a crack between adjacent chain side plates 59, in which case, positioning of the dog would be disturbed when the chain traveled around one of the end sprockets. It is therefore seen that only one of the set screws which is well within the area of a side plate need be utilized in order to properly mount a dog on the conveyor chain.

Figure 4:
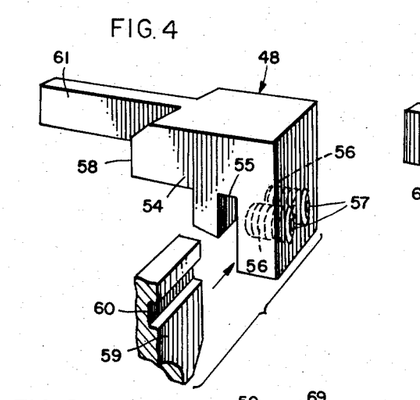
Figs. 4 to 9, inclusive, are perspective views of the various pusher and spacing members adapted for arrangement of the conveyor chains of the crate-making machine according to the invention.

The dog of Fig. 4 serves as a combination cleat pushing and aligning dog, and is provided with a cleat pushing arm or fin 61 extending laterally from the cleat aligning face 58. This dog is employed only in connection with the intermediate cleats 25 and 26 in pushing these cleats along the intermediate cleat guideways 35 and 36 as seen in Figs. 2 and 3. The cleat pushing arm is located intermediate the ends of the cleat aligning face 58 in order to aid in aligning the trailing end of the cleat being pushed and the leading end of the following cleat.

Figure 5:
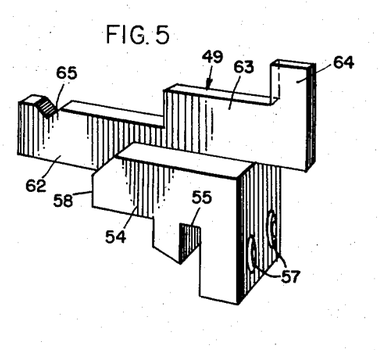

The dog 49 in Fig. 5 is utilized on the outside chains 40 and 43 at the trailing end of the last crate panel 18, Fig. 2, in functioning to align and push the upper and lower cleats 23 and 24 and to push and arrange the trailing corner slat 28 with respect to the cleats. This dog includes a cleat pushing fin 62 extending laterally from the cleat aligning face 58 and slightly above the top surface of the body portion 54, and a vertical upstanding slat pushing and arranging fin 63. An upward extension 64 is provided at the inner end of the slat pushing fin 63 in order to accommodate warped slats or thicker slats. Since the cleat pushing fin 62 extends slightly above the top surface of the body portion 54, a wire aligning groove or slot 65 is provided along the upper edge of the fin which aids in aligning the binding wires and permits it to lie closer to the cleat beneath the slats. The pushing surface of the cleat fin 62 and the slat fin 63 is coplanar thereby aligning the trailing edges of the cleats with the trailing edges of the slats in flush relationship.

Figure 6:
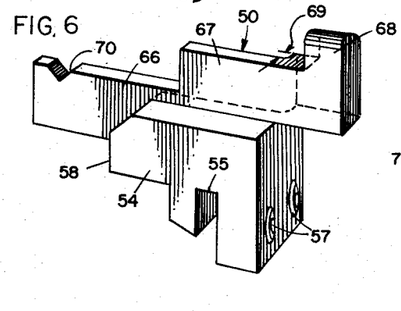

Referring to Fig. 6, the dog 50 is substantially identical in size and shape to the dog 49, in that it is provided with a similar cleat pushing fin 66, a slat pushing fin 67 having an extension 68, except that a built-up portion 69 is attached to the non-pushing side of the slat pushing fin 67. The cleat pushing fin 66 is also provided with the usual wire receiving slot 70. Referring now to Figs. 2 and 3, the dog 50 is seen to be utilized on the outside chains 40 and 43 and for pushing the outside cleats and trailing slats 28 of the panels 15 and 17, and at the leading edge of the panel 15. Again, the pushing side of the cleat fin 66 and the slat fin 67 is coplanar thereby arranging the trailing edge of the slats 28 of the panels 15 and 17 flush with the trailing edges of the cleats. It will be understood that the particular dog 50 shown in Fig. 6 can only be utilized on the chain 43, but that dogs of the exact dimension except with the built up portion on the opposite side of the slat pushing fin will be utilized on the other chain 40. It is important that the built up portion be on the trailing side of the slat pushing fin 67.

The built up portion 69 on the dogs 50 serves to flush the leading edges of the slats 27 of the panels 15, 16, and 18 with the leading edges of the cleats, since the cleats are slightly shorter than the distance between the dogs 50 and the pushing dogs behind the dogs 50, this being necessary in order to allow for easy insertion of the cleats in the cleat guideways between these dogs.

Figure 7:
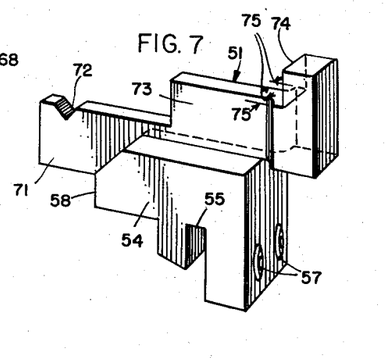
Figure 8:
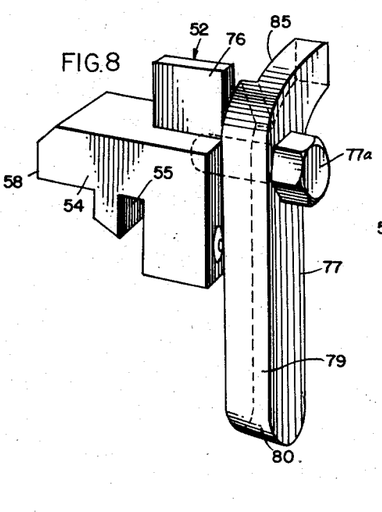
Figure 9:
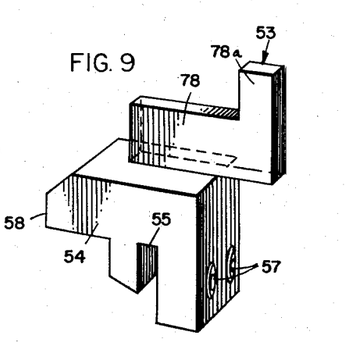

Referring now to Fig. 7, the dog 51 is similar in construction to the dogs 49 and 50 in providing a cleat pushing fin 71 having a wire receiving slot 72, and a slat pushing fin 73 having an extension 74. This dog differs in that the slat pushing fin is provided with built up portions 75 on both sides so that neither the pushing side nor the non-pushing side of this fin is coplanar with the pushing side or the non-pushing side of the cleat fin 71. This dog is utilized only on the outside chains 40 and 43 and between the panels 16 and 17 which defines the folding corner of the crate mat. The thickness of the built up portion on each side of the slat pushing fin is greater than the thickness of the built up portion 67 on the dog 50 and the built up portion 75 serves to space the trailing edge of the corner slat 28 of panel 16 and the leading edge of the corner slat 27 of the panel 17 inwardly from the adjacent ends of their respective cleats a distance preferably equal to the thickness of a corner slat in order to provide the necessary free length of binding wire at this folding corner of the crate mat so that the crate mat may be easily and quickly collapsed to a flat position without straining of the binding wire, as seen in Fig. 13.

Thus far, it is seen that the cleat pushing fins of the leading sets of dogs 50 coact with the cleat pushing fins of the following sets of dogs 50 defining with the cleat guideways a place for the upper and lower cleats 23 and 24 to be inserted at the beginning of the conveyor run, while the succeeding sets of dogs 51, 50, and 49 define the openings for the cleats of the panels 16, 17, and 18. Similarly, the spaced dogs 48 along the intermediate chains 41 and 42 define openings for the intermediate cleats 25 and 26 of the various panels.

It is desired that the corner slats 27 and 28 of the crate panels be accurately positioned with respect to the adjacent ends of the cleats of each panel before they are stapled together by the stapling units 11. Due to the natural friction in the cleat guideways, the cleats have a tendency to be intimately engaged with its pushing dog, and due to the movement of the conveyor towards the stapling unit, the trailing slats 28 of each panel have a tendency to be jarred in the direction opposite from that of the travel of the conveyor and therefore will intimately engage the slat pushing fin of the corresponding pushing dogs. Accordingly, the trailing slats 28 of each panel are automatically aligned with the adjacent ends of the cleats during the continuous operation of the conveyor and as the crate parts are advanced to the stapling machine.

When the leading corner slats 27 are placed on the conveyor, it is necessary to place them between the slat pushing fin 76 of the dogs 52 and the slat pushing fins of the dogs 50 and 51; and therefore, it is necessary to provide some clearance in order to provide for these slats to be easily arranged on the conveyor. It is further desired to accurately position these leading slats with respect to the adjacent ends of the cleats, and therefore the dog 52 is provided with a slat orienting lever 77 pivoted on the side of the body portion opposite the aligning face 58 on pin 77a. This slat orienting lever includes a flat camming surface 79 generally extending normal to the direction of chain travel and merging at the lower end of the lever with a curvate camming surface 80, all of this surface extending below the bottom edge of the dog body portion 54 and being in alignment with a spring pressed cam 81, Fig. 20.

The cam 81 includes a leading upwardly curved section 82 connected to a trailing downwardly curved section 83 by a flat horizontal section 84. This cam is of such length as to extend longitudinally of the machine and beneath the stapling units so that the slat orienting lever 77 of the dog 52 is being actuated during the time the stapling units are driving staples for fastening the crate parts together. The portion of the slat orienting lever above the pivot pin 77a is curved at 85 and which engages the trailing edges of the slats in order to push the leading edges of the slats into engagement with the non-pushing side of the slat fins on dogs 50 and 51, as seen in the right hand side of Fig. 3.

Since it is contemplated that the width of the slats may not be identical due to error or shrinkage in making the slats, the cam 81 is movable in parallelogram fashion against the bias of a spring 86, wherein the opposite ends of a cam 81 are pivotally connected to bars 87 and 88 which are in turn pivotally connected to a common support bar 89 and the spring 88 is connected to a downwardly extending end of the bar 87. The other end of the spring is attached to a hook 90 extending downwardly from the support bar 89. Hence, as the leading corner slats of each panel pass under the stapling units, they will be accurately positioned with respect to the adjacent ends of the cleats by the coaction between the dogs 52 and 51, in order to obtain the desired crate mat structure.

The dog 53 serves merely to align the cleat with the cleat aligning face 58, and is provided with a slat pushing fin 78 having an upwardly extending extension 78a, this dog being utilized on the outside chains 40 and 43 in order to define a position for placing the intermediate bracing slats 29 as seen in Figs. 2 and 3.

Figure 14:
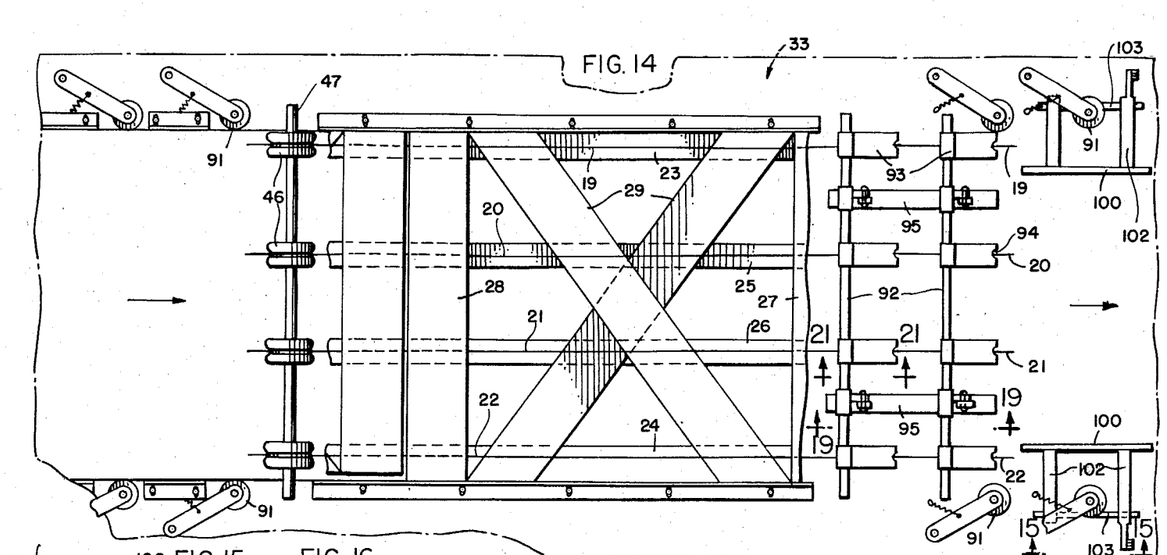
Fig. 14 is a top plan view of a portion of the crate-making machine according to the invention, with some parts omitted for purposes of clarity, and illustrating certain crate part aligning and positioning elements which are immediately ahead of the stapling units.

Referring again to Fig. 1, it will be noted that the lower cleats 24 of the panels 15 and 17 are wider than the lower cleats 24 of panels 16 and 18. It is obviously desirable to accurately position the outer cleats 24, as well as the other cleats 23, and for this purpose, the guide bars 39 are broken at the desired points for allowing spring biased aligning rollers 91 having a width greater than the combined thickness of any of the slats and cleats to engage the outer cleats and the outer edges of the slats and align them properly together as seen in Figs. 2, 3, and 14. The rollers 91 shown in Figs. 3 and 14 are spaced apart at such a distance and immediately ahead of the staple units so that the respective cleats are resiliently urged into position inwardly against the cleat aligning faces of the dogs on the conveyor chain immediately ahead of the stapling operation. Further, the spacing of these rollers is such that at least two rollers are contacting a cleat at all times.

Referring now particularly to Fig. 14, a short distance ahead of the stapling units, transversely extending parallel bars 92 are mounted above the conveyor bed for supporting resilient wire guide fingers 93 (also see Fig. 21) which have at their free ends a wire receiving slot 94. These two sets of longitudinally aligned wire receiving fingers ride over the top of the outer ends of the slats and along the upper and lower cleats in order to assure the aligning of the binding wires along the cleats. This feature is important in that the stapling heads drive staples in straddle relation with respect to the wires when stapling the crate parts together. Also supported on the bars 92 are transversely spaced presser bars 95 which are gravity actuated in parallelogram fashion. The presser bars 95 are pivotally connected at their leading and trailing ends to links 96 and 97, Fig. 19, which are in turn pivotally connected to brackets 98 and 99 of the bars 92.

Figures 15, 16, 21:
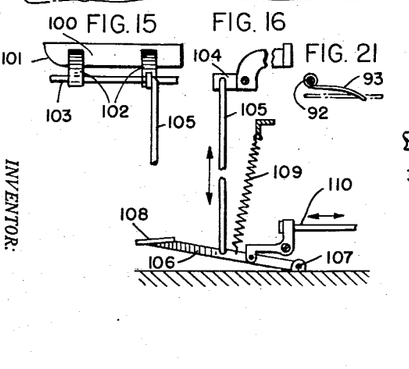
Fig. 15 is a detailed side elevational view, taken substantially along line 15—15 of Fig. 14, illustrating one of the crate part holddown devices.
Fig. 16 is a partially fragmentary and broken end elevational view of the holddown device of Fig. 15, and illustrating the foot release control.
Fig. 21 is a detailed side elevational view, taken substantially along line 21—21 of Fig. 14.

A second set of holddown members are provided for assuring that the slats are in close contact with the cleats; and these members include elongated shoes 100 extending longitudinally with respect to the direction of conveyor travel and having a leading curvate edge 101, Fig. 15, to facilitate receiving the slats without binding. The shoes are connected to bars 102 which are pivotally carried on a supporting rod 103. Extending from one of the bars 102 is an extension 104, Fig. 16, which pivotally receives one end of an actuating link 105, the other end of the link being pivotally received intermediate the ends of a control lever 106. The control lever is pivoted at one end to the floor or frame of the machine at 107 and carries a foot pedal 108 at the other end. A spring 109 is fastened to the control lever 106 at one end and to the frame of the machine at the other end in order to continually bias the holddown shoe 100 downwardly against the crate parts. When completely disarranged slats come through the machine, it is then necessary to operate the control lever 106 in order to raise the pressing shoe 100 and allow removal and proper arrangement of the disarranged parts. It will be appreciated that the control lever 106 should simultaneously actuate the presser shoes 100 at the opposite sides of the machine; and therefore, connecting linkage 110, Fig. 16, extends to the other side of the machine to suitably connect to the other presser bar. It should also be noted that the gravity actuated presser bars 95 and the spring biased presser shoes 100 generate some friction with the slats and cause them to move rearwardly against the proper slat pushing fins of the dogs.

Further means are provided to assure the proper positioning of the crate parts and the binding wires before they are fastened together by the stapling devices 11, and these devices are shown in Figs. 22 and 23. The cross bar 111 extends across the machine and is supported at opposite ends in vertical adjustable relationship to upstanding frame members 112 by brackets 113, the adjustability being provided by a rack and pinion gear arrangement 114. Pivotally carried on this cross bar at transversely spaced positions are grooved wire rollers 115 supported by a bell crank lever 116 at the pivot pin 117. The upstanding end of the bell crank is resiliently biased by a spring 118 to constantly urge the grooved rollers 115 down against the binding wires in a position directly ahead of the staplers 11. A resiliently biased cleat and slat aligning roller 119 bears against one side edge of a cleat in a manner similar to the rollers 91 in order to properly align the cleat and slats with respect to the stapling devices 11. Gravity actuated presser shoes 120 are positioned between the stapling devices in order to hold down the crate parts when they are being fed directly under the stapling heads. Hence, the present machine assures proper positioning of the binding wires and crate parts before they are fastened together by the stapling devices 11.

It will be understood that modifications and variations may be effected without departing from the scope of the novel concepts of the present invention, but it is understood that this application is to be limited only by the scope of the appended claims.

The invention is claimed as follows:

1. In a crate-making machine having stapling mechanism for driving staples into crate parts, an endless constantly moving conveyor adapted to feed continuously a plurality of crate parts arranged to form spaced crate panels, said conveyor including a conveyor bed having spaced parallel guideways for certain crate parts, a plurality of endless chains in parallel spaced relation and extending longitudinally of said machine, spacing and pushing members on said chains for advancing the crate parts in said guideways and for arranging other crate parts, the upper runs of said chains movable along said conveyor bed, and means for accurately arranging said crate parts with respect to each other for stapling thereof.

2. A crate-making machine for assembling cleats, slats and binding wires in a continuous operation to form wirebound crate mats having hingedly connected panels which comprises having a plurality of stapling units at one end of the machine for stapling the cleats, slats and binding wires together, an endless conveyor for continuously feeding prearranged cleats, slats and binding wires to the stapling units, said conveyor including a conveyor bed having a plurality of transversely spaced cleat guideways extending longitudinally of the machine, a plurality of transversely spaced endless chains having members carried thereon for spacing and advancing the cleats and slats along the machine, pressing members ahead of the stapling units for urging the crate parts into intimate contacting relationship, and means for accurately positioning the slats of each panel with respect to the adjacent ends of the cleats.

3. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, dogs mounted in spaced relation along the chains, each dog having a cleat pushing fin extending into the corresponding guideway for pushing cleats therealong and a vertical cleat aligning face coacting with the guideway in maintaining the cleats in proper longitudinal alignment, at least some of said dogs having slat pushing fins which extend above the cleat pushing fins, other dogs having slat orienting levers actuated by means on the conveyor for accurately orienting one edge of a slat with a corresponding end of a cleat, means for aligning the ends of the slats with the outer edges of said cleats, and means for uniting the crate parts and wires to form the crate mat.

4. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, dogs mounted in spaced relation along the chains, each dog having a cleat pushing fin extending into the corresponding guideway for pushing cleats therealong and a vertical cleat aligning face coacting with the guideway in maintaining the cleats in proper longitudinal alignment, at least some of said dogs having slat pushing fins which extend above the cleat pushing fins, other dogs having slat orienting levers actuated by means on the conveyor for accurately orienting one edge of a slat with a corresponding end of a cleat, and means for uniting the crate parts and wires to form the crate mat.

5. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, dogs mounted in spaced relation along the chains, each dog having a cleat pushing fin extending into the corresponding guideway for pushing cleats therealong and a vertical cleat aligning face coacting with the guideway in maintaining the cleats in proper longitudinal alignment, at least some of said dogs having slat pushing fins which extend above the cleat pushing fins, other dogs having slat orienting levers actuated by means on the conveyor for accurately orienting one edge of a slat with a corresponding end of a cleat, and means for uniting the crate parts and wires to form the crate mat.

6. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom and slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, at least some of said dogs having slat pushing fins which extend above the cleat pushing fins, other dogs having slat orienting levers actuated by means on the conveyor for accurately orienting one edge of a slat with a corresponding end of a cleat, and means for uniting the crate parts and wires to form the crate mat.

7. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, said vertical faces of some of said guideways having openings therealong, laterally biased means in said openings urging the cleats against the cleat aligning faces of said dogs, at least some of said dogs having slat pushing fins which extend above the cleat pushing fins, other dogs having slat orienting levers actuated by means on the conveyor for accurately orienting one edge of a slat with a corresponding end of a cleat, and means for uniting the crate parts and wires to form the crate mat.

8. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, said vertical faces of some of said guideways having openings therealong, laterally biased rollers in said openings for engaging said cleats and urging same against the cleat aligning faces of said dogs, at least some of said dogs having slat pushing fins which extend above the cleat pushing fins, other dogs having slat orienting levers actuated by means on the conveyor for accurately orienting one edge of a slat with a corresponding end of a cleat, and means for uniting the crate parts and wires to form the crate mat.

9. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, rollers having a thickness greater than the combined thickness of said cleats and slats and further engaging the ends of said slats to align them with respect to the cleat edges, at least some of said dogs having slat pushing fins which extend above the cleat pushing fins, other dogs having slat orienting levers actuated by means on the conveyor for accurately orienting one edge of a slat with a corresponding end of a cleat, and means for uniting the crate parts and wires to form the crate mat.

10. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, at least some of said dogs having slat pushing fins which extend above the cleat pushing fins, other dogs having slat orienting levers actuated by means on the conveyor for accurately orienting one edge of a slat with a corresponding end of a cleat, for uniting the crate parts and wires to form the crate mat.

11. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, at least some of said dogs having slat pushing fins which extend above the cleat pushing fins, other dogs having slat orienting levers actuated by means on the conveyor for accurately orienting one edge of a slat with a corresponding end of a cleat, means for holding said crate parts downwardly against said guideways, and means for uniting the crate parts and wires to form the crate mat.

12. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, at least some of said dogs having slat pushing fins which extend above the cleat pushing fins, other dogs having slat orienting levers actuated by means on the conveyor for accurately orienting one edge of a slat with a corresponding end of a cleat, gravity actuated presser bars mounted above said conveyor for urging said crate parts downwardly against said guideways, and means for uniting the crate parts and wires to form the crate mat.

13. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, at least some of said dogs having slat pushing fins which extend above the cleat pushing fins, other dogs having slat orienting levers actuated by means on the conveyor for accurately orienting one edge of a slat with a corresponding end of a cleat, gravity actuated presser bars mounted above said conveyor for urging said crate parts downwardly against said guideways, resiliently biased presser bars down machine from said gravity actuated presser bars and mounted above said conveyor for urging said crate parts downwardly against said guideways, and means for uniting the crate parts and wires to form the crate mat.

14. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, at least some of said dogs having slat pushing fins which extend above the cleat pushing fins, other dogs having slat orienting levers actuated by means on the conveyor for accurately orienting the leading edge of a leading slat in each panel relative to a corresponding end of a cleat, gravity actuated presser bars mounted above said conveyor for urging said crate parts downwardly against said guideways and into intimate contact with each other, resiliently biased presser bars down machine from said gravity actuated presser bars and mounted above said conveyor for urging said crate parts downwardly against said guideways, linkage means actuatable for raising said resiliently biased presser bars above and away from the crate parts, and means for uniting the crate parts and wires to form the crate mat.

15. A crate-making machine for assembling cleats, slats and binding wires in a continuous operation to form wirebound crate mats having hingedly connected panels which comprises, an endless conveyor having a plurality of transversely spaced parallel chains driven in unison, an adjustable cleat guideway extending in parallel relation laterally of the upper run of each chain, each guideway including a horizontal face slidably engaging one of the broad sides of a cleat and a vertical face extending upwardly therefrom slidably engaging one of the narrow vertical edges of a cleat, dogs mounted in spaced relation along the chains, each dog having a cleat pushing fin extending into the corresponding guideway for pushing cleats therealong and a vertical cleat aligning face coacting with the horizontal and vertical faces of a corresponding guideway to define a trough for the cleats and maintain the cleats in proper longitudinal alignment, at least some of said dogs having slat pushing fins which extend above the cleat pushing fins and having built up portions for aligning the slats relative to the ends of corresponding cleats, other dogs having slat orienting levers actuated by means on the conveyor for accurately orienting the leading edge of a leading slat in each panel relative to a corresponding end of a cleat, gravity actuated presser bars mounted above said conveyor for urging said crate parts downwardly against said guideways and into intimate contact with each other, resiliently biased presser bars down machine from said gravity actuated presser bars and mounted above said conveyor for urging said crate parts downwardly against said guideways, linkage means actuatable for raising said resiliently biased presser bars above and away from the crate parts, and means for uniting the crate parts and wires to form the crate mat.

References Cited in the file of this patent

UNITED STATES PATENTS

| | | |
|---|---|---|
| 1,406,105 | Thompson | Feb. 7, 1922 |
| 1,748,975 | Craig | Mar. 4, 1930 |
| 1,865,879 | Newhouse | July 5, 1932 |
| 2,008,828 | Igleheart | July 23, 1935 |
| 2,134,116 | Florcyk | Oct. 25, 1938 |
| 2,557,515 | Riker | June 19, 1951 |